United States Patent
Jones

(10) Patent No.: US 9,169,725 B1
(45) Date of Patent: *Oct. 27, 2015

(54) METHOD OF STRIPPING CRUDE OIL AND HYDRAULIC FRACTURING FLUIDS FROM WATER USING A GAS SPARGED HYDROCYCLONE

(71) Applicant: John D. Jones, Phoenix, AZ (US)

(72) Inventor: John D. Jones, Phoenix, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/268,134

(22) Filed: May 2, 2014

Related U.S. Application Data

(60) Provisional application No. 61/902,260, filed on Nov. 10, 2013.

(51) Int. Cl.
| | | |
|---|---|---|
| *C02F 1/24* | (2006.01) | |
| *B01D 17/035* | (2006.01) | |
| *E21B 43/16* | (2006.01) | |
| *B01D 19/00* | (2006.01) | |
| *C02F 101/32* | (2006.01) | |
| *B03D 1/14* | (2006.01) | |
| *B01D 17/02* | (2006.01) | |

(52) U.S. Cl.
CPC ............... *E21B 43/168* (2013.01); *C02F 1/24* (2013.01); *B01D 17/0205* (2013.01); *B01D 19/0057* (2013.01); *B03D 1/1425* (2013.01); *B03D 1/1462* (2013.01); *C02F 2101/32* (2013.01)

(58) Field of Classification Search
None
See application file for complete search history.

(56) References Cited

U.S. PATENT DOCUMENTS

| | | | |
|---|---|---|---|
| 4,279,743 A | 7/1981 | Miller | |
| 4,397,741 A | 8/1983 | Miller | |
| 4,399,027 A | 8/1983 | Miller | |
| 4,997,549 A | 3/1991 | Atwood | |
| 5,122,165 A * | 6/1992 | Wang et al. | 95/92 |
| 5,405,497 A * | 4/1995 | Torregrossa | 162/38 |
| 5,529,701 A * | 6/1996 | Grisham et al. | 210/787 |
| 5,531,904 A | 7/1996 | Grisham et al. | |
| 5,858,237 A | 1/1999 | Hashmi | |
| 6,602,327 B2 | 8/2003 | Morse et al. | |
| 6,949,195 B2 | 9/2005 | Morse et al. | |
| 7,934,606 B2 | 5/2011 | Greene et al. | |
| 8,281,932 B2 | 10/2012 | Schneider et al. | |
| 8,286,805 B2 | 10/2012 | Hopper | |
| 8,313,565 B2 | 11/2012 | Sarshar et al. | |
| 8,475,664 B2 | 7/2013 | Keyser et al. | |
| 8,529,772 B2 | 9/2013 | Hopper | |
| 2005/0172808 A1* | 8/2005 | Yi | 95/245 |
| 2012/0118818 A1 | 5/2012 | Moraes et al. | |
| 2013/0146536 A1 | 6/2013 | Tarabara et al. | |

FOREIGN PATENT DOCUMENTS

| | | |
|---|---|---|
| CN | 1046753 C | 8/1994 |
| CN | 2348097 Y | 3/1998 |
| CN | 1358552 A | 12/2001 |
| CN | 1546196 A | 12/2003 |

(Continued)

*Primary Examiner* — Thomas M Lithgow

(57) ABSTRACT

Water contaminated with crude oil and/or hydraulic fracturing fluids from oil reservoirs or gas/oil fracturing wells is stripped of these contaminating products with a specialized gas sparged hydrocyclone apparatus in conjunction with the method of the present invention. Various products are recovered with the present invention, including water, petroleum products, hydraulic fracturing fluids, and other hydrocarbon compounds. These products can be returned to the source, stored, transported, sold, or otherwise reused.

11 Claims, 2 Drawing Sheets

(56) References Cited

FOREIGN PATENT DOCUMENTS

| | | |
|---|---|---|
| CN | 200945382 Y | 7/2006 |
| CN | 200981025 Y | 10/2006 |
| CN | 101362629 A | 7/2007 |
| CN | 101793138 A | 3/2010 |
| UA | 74981 C2 | 9/2004 |
| WO | 88/09696 A1 | 12/1988 |
| WO | WO2012/071672 A1 * | 6/2012 |

* cited by examiner

METHOD OF STRIPPING CRUDE OIL AND HYDRAULIC FRACTURING FLUIDS FROM WATER USING A GAS SPARGED HYDROCYCLONE

CROSS REFERENCE TO RELATED APPLICATIONS

This application claims priority to provisional application Ser. No. 61/902,260, filed Nov. 10, 2013.

FIELD OF THE INVENTION

The present invention relates to the removal of hydrocarbons, such as crude oil and hydraulic fracturing fluids, from water. Removal of these materials from water involves the use of a specialized gas sparged hydrocyclone apparatus.

BACKGROUND OF THE INVENTION

Pressurized fracturing fluids are injected into wells, creating cracks in geological formations, that allow oil and gas to escape through the wall to be collected on the surface. The release of the hydraulic fracturing fluid is a mixture of chemicals, hydrocarbons, natural occurring substances and propants. The design of this process is to remove these materials so that water can be cleaned and can be re-used for additional hydraulic fracturing projects or disposed into a safe above ground environment to be further cleaned to produce clean potable water.

The second application of this technology is the removal of crude oil from water in oil production fields. Oil production wells commonly contain a combination of crude oil and water. In many instances, the produced water from these fields is re-injected back into the underground oil reservoir. The water that is pumped with the crude oil will contain a certain amount of crude oil after the oil/water separation is performed above ground. The separation techniques used is typically a static gravity collection system consisting of large tanks plus an oil water separator system. These techniques require a long retention time in large oil/water tanks.

Alternatively, contaminates from the hydraulic fracturing fluid and the crude oil reservoir water are removed by using a reacting or stripping gas, such as air, carbon dioxide or other gas. In some instances, an air sparged hydrocyclone apparatus is used for the flotation or cleaning of coal, for the flotation or processing of tar sands, and for separating minerals from their host material by flotation. U.S. Pat. Nos. 4,279,743; 4,397,741; and 4,399,027, each issued to Miller, disclose an air sparged hydrocyclone apparatus. The apparatus of Miller does not remove hydrocarbons from water.

Shumeng, et al. disclose a hydrocyclone unit in published Chinese patent application No. 200620148747.2 (Patent ID: CN 200981025 Y). According to Shumeng, et al., the hydrocyclone units is used for separating oil from water. The apparatus of Shumeng, et al. does not utilize negative pressure in conjunction with the apparatus. Nor does the hydrocyclone unit of Shumeng et al. have an unrestricted lower outflow opening. Rather, the lower outflow from the unit restricts flow with a tapered outlet.

Kalnins discloses a hydrocyclone unit in Published PCT application No. WO 88/09696. The hydrocyclone unit utilizes a pressure-reducing device in the form of a venturi positioned at the end of a fluid inlet where inflowing contaminated liquid is introduced to the lower end of the hydrocyclone unit. The negative pressure created by the venturi increases the rate of flow of the inflowing contaminated liquid. Kalnins does not use negative pressure to separate hydrocarbon compounds from liquids, such as water.

Accordingly, none of these references disclose methods of removing hydrocarbon compounds and related products from water according to the present invention.

SUMMARY OF THE INVENTION

The present invention relates to a method of removing substantial amounts of hydrocarbon compounds, usually in the form of petroleum products, from water. In particular, the present invention utilizes a specialized gas sparged hydrocyclone apparatus to remove, or strip, contaminates in the form of hydraulic fracturing fluids, crude oil, or other petroleum-based hydrocarbons from water and thus reduce the amount of these contaminates from the water. The clean water produced from this technology can be safely re-used for hydraulic fracturing fluids or other purposes. For example, the clean water obtained from the present invention can be re-injected back into the oil reservoir with a significantly reduced amount of suspended crude oil and other hydrocarbon compounds.

The present invention utilizes a specialized gas sparged hydrocyclone apparatus for mixing a stripping gas, such as air, oxygen, carbon dioxide, nitrogen, argon, helium, or other appropriate gas with hydraulic fracturing fluids, crude oil, and other petroleum-based hydrocarbons present in water. The specialized apparatus comprises a hydrocyclone top, or head portion, secured to a rigid container located below the hydrocyclone top. A sparger is positioned and retained inside the rigid container. The sparger is a porous substantially cylindrical element. In preferred embodiments, the sparger is made of sintered stainless steel. An appropriate stripping gas is fed under pressure to the rigid container through a conduit. The rigid container has one or more inlets traversing the rigid container and in fluid communication with a plenum positioned between the rigid container and the sparger. Once in the plenum, the stripping gas flows from the plenum through the pores of the sparger and into a hollow interior area in the center of the sparger. A source of negative pressure or partial vacuum is in fluid communication with the interior area of the sparger. With the aid of negative pressure or partial vacuum present in the apparatus, crude oil, hydraulic fracturing fluid, and/or other hydrocarbons are readily separated from the water.

In the process, liquid water contaminated with crude oil, hydraulic fracturing fluid, and/or other hydrocarbons is fed into the hydrocyclone top from a conduit. The crude oil, hydraulic fracturing fluid, and/or other hydrocarbon-contaminated water moves downwardly from the hydrocyclone top into the interior area of the sparger in a spiraling or swirling fashion to form a vortex. When the stripping gas passes through pores in the sparger and exits the sparger in the presence of crude oil, hydraulic fracturing fluid, and/or other hydrocarbon-contaminated water, the stripping gas forms numerous bubbles. As the bubbles encounter and mix or react with the vortex of crude oil, hydraulic fracturing fluid, and/or other hydrocarbon-contaminated water in the interior area of the sparger, a froth or foam is formed. The crude oil, hydraulic fracturing fluid, and/or other hydrocarbons are captured and separated from most or all of the crude oil, hydraulic fracturing fluid, and/or other hydrocarbon-contaminated liquid water by the froth or foam. Under the influence of negative pressure or partial vacuum present in the apparatus, a portion of the froth or foam collapses and transforms into a stream of liquid water substantially free of crude oil, hydraulic fracturing fluid, and/or other hydrocarbons. Collapse of the froth or foam occurs above the bottom of the sparger. The stream of liquid water, stripped or otherwise substantially removed of crude oil, hydraulic fracturing fluid, and/or other hydrocarbons, continues to flow downwardly through an unrestricted opening in a bottom, or lower, portion the sparger into a first reservoir or storage vessel located beneath the hydrocyclone apparatus. Also with the aid of negative pressure or partial vacuum present in the apparatus, crude oil, hydraulic fracturing fluid, and/or other hydrocarbon-containing froth or foam flows upwardly in the interior area of the sparger. The crude oil, hydraulic fracturing fluid, and/or other hydrocarbon-containing froth or foam flows out of the interior area of the sparger through the hydrocyclone top and into a conduit. The crude oil, hydraulic fracturing fluid, and/or other hydrocarbon-containing froth or foam moves through the conduit into a separate second reservoir, "overflow drum," or "surge vessel." Once in the second reservoir, the froth or foam completely disintegrates or collapses. Contaminants such as volatile organic compounds can also be present in the froth or foam. The previously crude oil, hydraulic fracturing fluid, and/or other hydrocarbon-containing liquid water component of the froth or foam drops to a bottom portion of the second reservoir. The liquid water and any dissolved contaminates residing in the bottom of the second reservoir flow out of an opening or conduit in the bottom of the second reservoir for appropriate handling. The remaining components of the disintegrated froth or foam contain primarily liberated crude oil, hydraulic fracturing fluid, and/or other hydrocarbons. The separated, or liberated, crude oil, hydraulic fracturing fluid, and/or other hydrocarbons flow out of the upper region of the second reservoir through an opening or conduit where the crude oil, hydraulic fracturing fluid, and/or other hydrocarbons are recovered for appropriate disposal or use.

Accordingly, one embodiment of the present invention relates to a method of removing hydrocarbon contaminates from water comprising the steps of providing a hydrocyclone unit including a hydrocyclone top, a rigid container disposed beneath said hydrocyclone top, a sparger in said rigid container, a plenum between said rigid container and said sparger, a first reservoir beneath said sparger, wherein said sparger has an open end in unrestricted fluid communication with said first reservoir, providing a flow of water contaminated with hydrocarbons to said hydrocyclone top and downwardly into said sparger, providing a flow of stripping gas to said plenum and into said sparger, mixing said stripping gas with the water contaminated with hydrocarbons in said sparger to provide a hydrocarbon-containing froth and water stripped of hydrocarbons, capturing said hydrocarbon-containing froth from said hydrocyclone unit, separating stripping gas from said hydrocarbon-containing froth, disposing said stripping gas, and capturing said water stripped of hydrocarbons from said sparger.

In preferred embodiments, hydrocarbon contaminates are in the form of crude oil, hydraulic fracturing fluids, and/or other hydrocarbon-containing compounds.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE INVENTION

Figure 1:
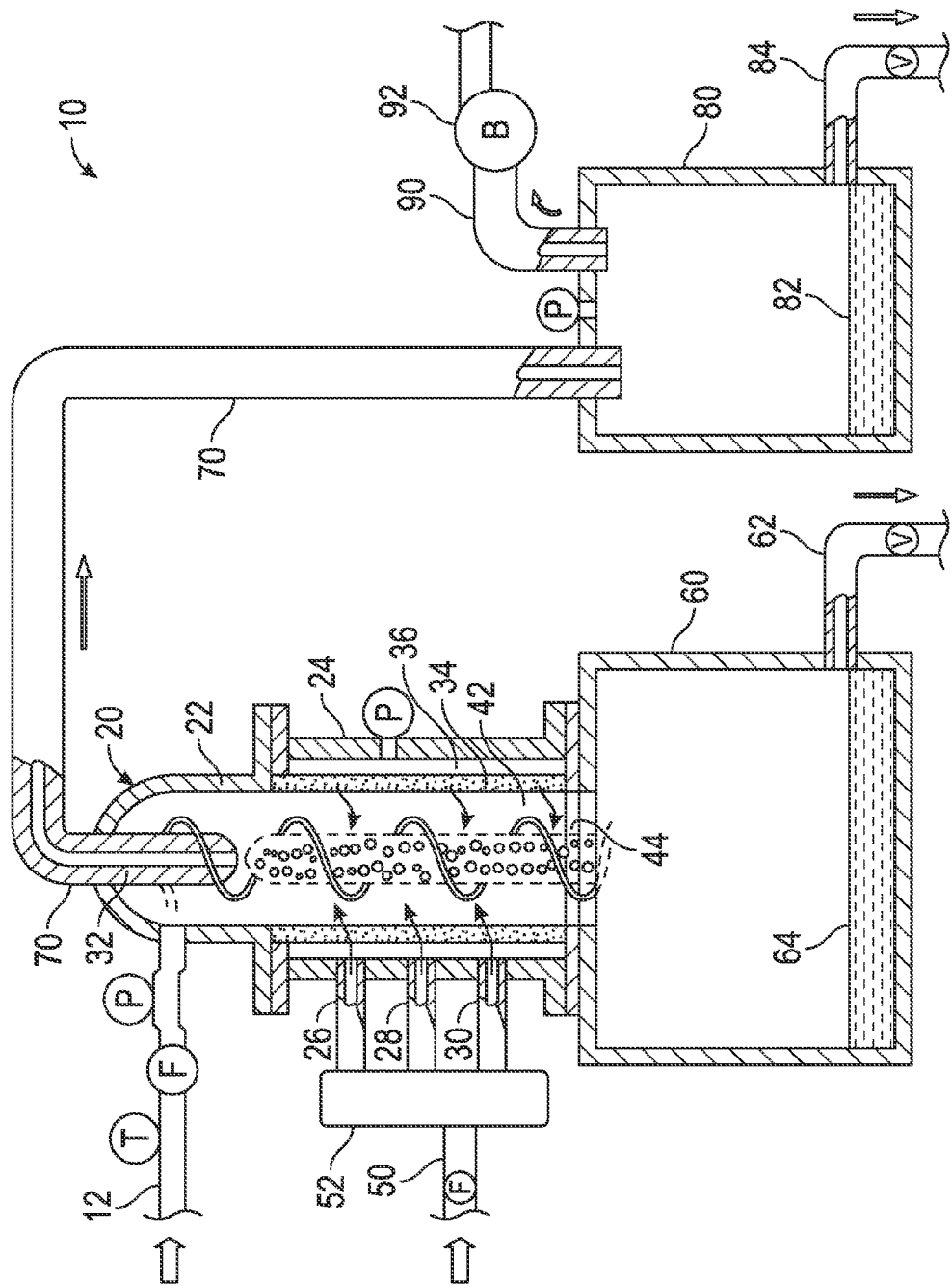
FIG. 1 illustrates a schematic block diagram, with elements in partial section, of an air sparged hydrocyclone system suitable for use in the present invention.

FIG. 1 is a schematic block diagram of apparatus 10, portions of which are in partial section, illustrating the method of the present invention in reacting or stripping crude oil, hydraulic fracturing fluids, and/or other hydrocarbon-containing compounds from liquids. Water contaminated with crude oil, hydraulic fracturing fluids, and/or other hydrocarbon-containing compounds flows in a feed conduit 12 to a specialized gas sparged hydrocyclone unit 20. The flow rate in the conduit 12 may vary from about fifteen (15) gallons per minute to about thirty (30) gallons per minute. A flow of about fifteen (15) gallons per minute (gpm) is preferred.

Appropriate sensors, such as temperature, pressure, and flow rate, and valves, indicated respectively by T, P, F, and V, are associated with the various elements of the apparatus 10. Other appropriate valves and related equipment, not shown, is also associated with the conduit 12. Sensors and other control devices may be added as desired.

The unit 20 includes a hydrocyclone top 22 disposed at the top of a rigid container 24. The rigid container 24 can have many forms including, but not limited to, straight and/or curved tubes of various cross-sections, spheres, cubes, rectangular boxes, cylinders, ovoids, and combinations thereof. The rigid container can be made of a variety of materials including, but not limited to, metals, ceramics, polymers, composites, and combinations thereof. A preferred material for the rigid container 24 is steel. The conduit 12 is connected to the hydrocyclone top 22. Within the rigid container 24 is a sparger 34. The rigid container 24 and the sparger 34 are secured to a first reservoir, "underflow drum," or "residual disengagement vessel" 60 positioned beneath, or under, the rigid container 24 and sparger 34 combination.

As illustrated in FIG. 1, the sparger 34 is located within the rigid container 24. The inner diameter of the rigid container 24 is greater than the outer diameter of the sparger 34. Between the sparger 34 and the rigid container 22 is a plenum 36. Gas inflowing from a conduit 50 and manifold 52 flows into the plenum 36 under pressure through at least one input conduit, runner, or inlet. Preferably, a plurality of input conduits, runners, or inlets is used. Three such input conduits, runners, or inlets 26, 28 and 30 are illustrated in FIG. 1. Gas flow to the rigid container 24 from the manifold 52 may vary in accordance with the flow rate of the crude oil, hydraulic fracturing fluids, and/or other hydrocarbon-contaminated water in the feed conduit 12. The gas flow rate is measured in standard cubic feet per minute (scfm). Gas flow to the rigid container 24 from the manifold 52 may vary from about five (5) scfm to about fifteen (15) scfm. The reacting or stripping gas in the conduit 50 may be air, oxygen, carbon dioxide, nitrogen, argon, helium, or other appropriate gas. The sparger 34 is porous to the flow of a desired stripping gas. The positive pressure in the plenum insures the inwardly flowing stripping gas moves through the pores in the sparger 34 relatively uniformly along the length of the sparger. Uniform movement of stripping gas through the sparger 34 evenly mixes the stripping gas with a downward spiraling flow of crude oil, hydraulic fracturing fluids, and/or other hydrocarbon-contaminated water. In preferred embodiments, the sparger 34 is porous through the entire sintered tube. Initially, stripping gas from the conduit 50 flows through one or more inlets of the rigid container 24 and into the plenum 36. The stripping gas is at a pressure sufficient to cause the stripping gas to flow through the pores of the sparger 34. As the stripping gas flows from the plenum 36 through the pores in the sparger 34, the gas enters a chamber 42 in an interior area of the sparger.

The hydrocyclone top 22 induces a swirling or spiraling motion in the downwardly flowing crude oil, hydraulic fracturing fluids, and/or other hydrocarbon-contaminated water to form a vortex. As the stripping gas enters the interior area of the sparger in the presence of crude oil, hydraulic fracturing fluids, and/or other hydrocarbon-contaminated water, numerous gas bubbles are formed. The gas bubbles mix with the crude oil, hydraulic fracturing fluids, and/or other hydrocarbon-contaminated water flowing downwardly in a vortex from the hydrocyclone top 22 in the interior area of the sparger 34 to form a froth or foam therein. The froth, or foam, contains a mixture of liquid water and crude oil, hydraulic fracturing fluids, and/or other hydrocarbon-contaminating products. With the application of negative pressure or partial vacuum, the crude oil, hydraulic fracturing fluids, and/or other hydrocarbon-containing portion of the froth flows upwardly in the sparger, out of the hydrocyclone top 22, through a vortex finder or upper nozzle 32 in the hydrocyclone top 22 and into a conduit 70. The vortex finder or upper nozzle 32 is appropriately secured and sealed to the hydrocyclone top 22 and the conduit 70.

The upwardly flowing foamy or frothy mixture of crude oil, hydraulic fracturing fluids, and/or other hydrocarbon-contaminating products and residual water flows through the conduit 70 to a second reservoir, overflow vessel, separator, surge vessel, or drum 80. As the crude oil, hydraulic fracturing fluids, and/or other hydrocarbon-containing froth or foam enters the second reservoir, the froth or foam collapses or otherwise disintegrates under the influence of negative pressure or partial vacuum present in the second reservoir.

As the froth or foam collapses or disintegrates in the second reservoir, residual liquid water and any dissolved, suspended, admixed, or emulsified materials separate from the foam, or froth, and move to a bottom portion of the second reservoir, overflow vessel, separator, surge vessel, or drum 80. The water cleansed or purified of crude oil, hydraulic fracturing fluids, and/or other hydrocarbon-contaminated flows outwardly from the second reservoir, overflow vessel, separator, surge vessel, or drum 80 through a regulated conduit 84 for appropriate disposition. Large arrows by the respective conduits in FIG. 1 show the direction of flow of the various materials.

In addition to residual liquid water and any dissolved, suspended, admixed, or emulsified materials separating from the froth or foam as the froth of foam collapses or disintegrates in the second reservoir, the crude oil, hydraulic fracturing fluids, and/or other hydrocarbons separate from the froth or foam. The crude oil, hydraulic fracturing fluids, and/or other hydrocarbons occupy an upper portion of the second reservoir apart from the substantially crude oil, hydraulic fracturing fluids, and/or other hydrocarbon-free liquid water residing in the bottom of the second reservoir. The gaseous crude oil, hydraulic fracturing fluids, and/or other hydrocarbons exit the upper portion of the second reservoir through an opening or conduit 90 where the crude oil, hydraulic fracturing fluids, and/or other hydrocarbons are recovered for appropriate disposal or use.

A vacuum pump or blower 92 in the conduit 90 causes a negative pressure or partial vacuum to be generated in the second reservoir, overflow vessel, separator, surge vessel, or drum 80. The negative pressure or partial vacuum extends into conduit 70 through the hydrocyclone head 22 and into the interior of the sparger 34. The negative pressure or partial vacuum in the system pulls the frothy, or foamy, mixture out of the hydrocyclone unit 20 through the upper nozzle or vortex finder 32, into the conduit 70, and on to the second reservoir, overflow vessel, separator, surge vessel, or drum 80. The negative pressure or partial vacuum in the second reservoir, overflow vessel, separator, surge vessel, or drum 80 also helps to disengage remaining gaseous products from the water residing in the second reservoir, overflow vessel, separator, surge vessel, or drum 80.

The downwardly flowing water, minus the contaminating crude oil, hydraulic fracturing fluids, and/or other hydrocarbon products which have been captured in the upwardly flowing froth or foam within the sparger 34, goes into a first reservoir, "underflow drum," or "residual disengagement vessel" 60 through an unrestricted opening in the bottom, or lower, end 44 of the sparger 34. Crude oil, hydraulic fracturing fluids, and/or other hydrocarbon-free water flows out through a conduit 62 in the first reservoir, "underflow drum," or "residual disengagement vessel" 60 and returns to a storage tank (not shown). Flow from the first reservoir, "underflow drum," or "residual disengagement vessel" 60 and into the conduit 62 is appropriately regulated to keep the water level at an appropriate height in the reservoir. The water level in the first reservoir, underflow drum, or residual disengagement vessel 60 is indicated by reference numeral 64.

The flow of the froth, or foam, from the chamber within the sparger 34 is dynamically moved due to the differential pressure between the first reservoir, "underflow drum," or "residual disengagement vessel" 60 and the second reservoir, overflow vessel, separator, surge vessel, or drum 80.

The apparatus 10, including the hydrocyclone unit 20, with its hydrocyclone top 22, the rigid container 24, and the upper nozzle or vortex finder 32, the first reservoir, "underflow drum," or "residual disengagement vessel" 60, second reservoir, overflow vessel, separator, surge vessel, or drum 80, and the various conduits, comprise a sealed system. The negative pressure or partial vacuum in the system from the blower 92 is about six (6) inches of mercury (Hg).

The generally spiraling downward liquid flow in the sparger 34 is schematically illustrated in FIG. 1 by arrows and the generally upwardly flow of the foam or froth is also schematically illustrated in FIG. 1 by arrows. Similarly, the flow of the stripping gas through the pores in the sparger is schematically illustrated in FIG. 1 by small arrows.

Figure 2:
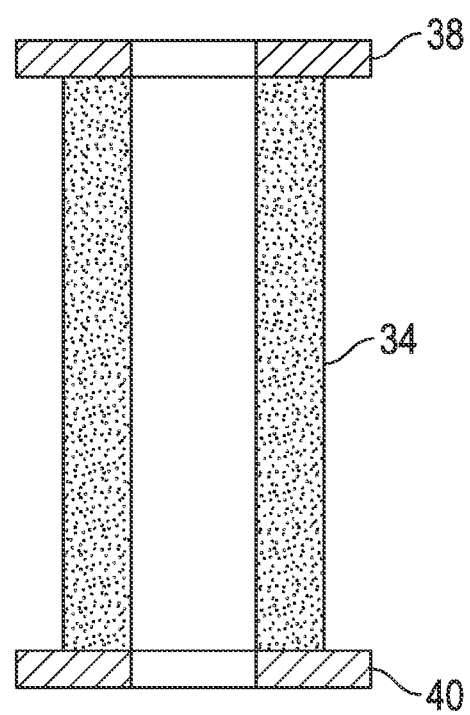
FIG. 2 illustrates a cross-sectional view of an air sparger suitable for use in the present invention.

FIG. 2 is an enlarged view in partial section through the sparger 34 of FIG. 1. For the following discussion, reference will primarily be made to FIG. 2, but reference will also be made to FIG. 1.

The sparger 34 comprises a tube or pipe made of one or more porous materials. Suitable materials for the sparger 34 include, but are not limited to, sintered metallic particles, porous high density polyethylene, porous foil mesh, porous ceramic membrane made from aluminum oxide and/or silicon carbonate membrane. Preferred sintered metallic particles are stainless steel. The pores in the sintered tube are of such a size as to permit the flow of a gas through the tube or pipe and into the interior of the sparger element, but not permit liquids to pass therethrough when gas is flowing through the sparger. Preferred pore sizes vary from about five microns (5 μm) to about eighty microns (80 μm).

Referring to FIG. 2, the sparger 34 also includes a pair of plates, a top plate 38 and a bottom plate 40. The plates 38 and 40 are outwardly extending flanges which provide the elements for sealing and securing the sparger to the hydrocyclone head 22, the rigid container 24, and the first reservoir, "underflow drum," or "residual disengagement vessel" 60.

Appropriate securing and sealing elements, such as bolts, o-rings, welds, and the like have been omitted from the drawing figures. It is understood the various elements, including the various conduits and sensors, are appropriately secured and sealed in the apparatus and system.

The sparger element has been described in conjunction with the stripping of contaminating products from water, it will be understood that such sparger may also be used in other applications. Another application is for the removal of contaminates from water such as volatile organic compounds.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of removing hydrocarbon contaminates from water comprising the steps of:
   providing a hydrocyclone unit including:
      a hydrocyclone top;
      a rigid container disposed beneath said hydrocyclone top;
      a sparger in said rigid container;
      a plenum between said rigid container and said sparger;
      a first reservoir beneath said sparger;
      wherein said sparger has an open end in unrestricted fluid communication with said first reservoir;
      a conduit having one end in fluid communication with an upper outlet of said hydrocyclone top and an opposite end in fluid communication with a second reservoir;
   providing a flow of water contaminated with hydrocarbons to said hydrocyclone top and downwardly into said sparger;
   providing a flow of stripping gas to said plenum and into said sparger;
   mixing said stripping gas with the water contaminated with hydrocarbons in said sparger to provide a hydrocarbon-containing froth and water stripped of hydrocarbons;
   capturing said hydrocarbon-containing froth from said hydrocyclone unit;
   separating stripping gas from said hydrocarbon-containing froth;
   disposing said stripping gas; and
   capturing said water stripped of hydrocarbons from said sparger.

2. The method of claim 1 wherein the sparger is a porous sintered stainless steel tube having pores of sufficient size to permit the stripping gas to flow through the sintered stainless steel tube and into the sparger while substantially preventing fluids from flowing into the pores.

3. The method of claim 1 further comprising a vortex finder in the hydrocyclone top.

4. The method of claim 1 wherein the stripping gas is air.

5. The method of claim 1 wherein the stripping gas is carbon dioxide.

6. The method of claim 1 wherein the stripping gas is pressurized.

7. The method of claim 1 further comprising the step of providing negative pressure to the second reservoir.

8. The method of claim 1 further comprising the step of providing a partial vacuum to the second reservoir.

9. The method of claim 1 wherein said hydrocarbons are petroleum-based compounds.

10. The method of claim 1 wherein said hydrocarbons comprise hydraulic fracturing fluids.

11. The method of claim 1 wherein said hydrocarbons comprise crude oil.

* * * * *